Jan. 22, 1963 A. DOUTY 3,075,143
ELECTRICAL MEASURING EQUIPMENT
Filed May 24, 1960

INVENTOR
Alfred Douty
BY
Synnestvedt & Lechner
ATTORNEYS

United States Patent Office 3,075,143
Patented Jan. 22, 1963

3,075,143
ELECTRICAL MEASURING EQUIPMENT
Alfred Douty, Wyncote, Pa., assignor to Amchem Products, Inc., Ambler, Pa., a corporation of Delaware
Filed May 24, 1960, Ser. No. 31,319
2 Claims. (Cl. 324—30)

This invention relates to an improvement in electrical measuring equipment of the type which is especially suited for measuring the resistance or resistance determinative properties of a circuit.

It is especially concerned with an improvement in electrical measuring equipment of the type described in my U.S. Patent 2,224,382 issued December 10, 1940. Equipment of this type has proved to be very useful in the measurement of the electrical resistance of various solutions. Since the resistance is a parameter of concentration in many solutions, equipment of this type when specially calibrated provides a convenient and fast means for measuring concentration.

I have found that when the circuitry described in my U.S. Patent 2,224,382 has been in service for great lengths of time, the electrical characteristics of various parts of the circuit change somewhat. Inasmuch as the indicating means in the equipment are very often provided with specially calibrated scales reading, for example, in units of concentration, such changes in electrical characteristics will lead to spurious or inaccurate and misleading indications. This result is both inconvenient and difficult to detect. In addition, once the inaccuracy of a piece of equipment has been detected, it has heretofore been necessary to completely disconnect it from its installation for readjustment and recalibration.

It is an object of this invention to provide means for the detection of, and the compensation for, changes in the electrical characteristics of components of the electrical measuring equipment described above, which lead to inaccurate readings.

Another object of this invention is to provide means for the recalibration of electrical measuring equipment of the type described above, which means may be used without removing the equipment from its installation.

It is a further object of this invention to provide means for increasing the service life of the electrical measuring equipment described above by insuring its accuracy despite changes in the electrical characteristics of certain of its components.

Other objects and purposes of this invention will appear from a consideration of the description which follows and the accompanying drawings in which.

I have described in my U.S. Patent 2,224,382 in detail the circuitry and equipment required for the electrical measuring equipment apart from the improvement discussed herein. Therefore, I will simply outline here the principles involved in the basic measuring circuit.

Figure 1:
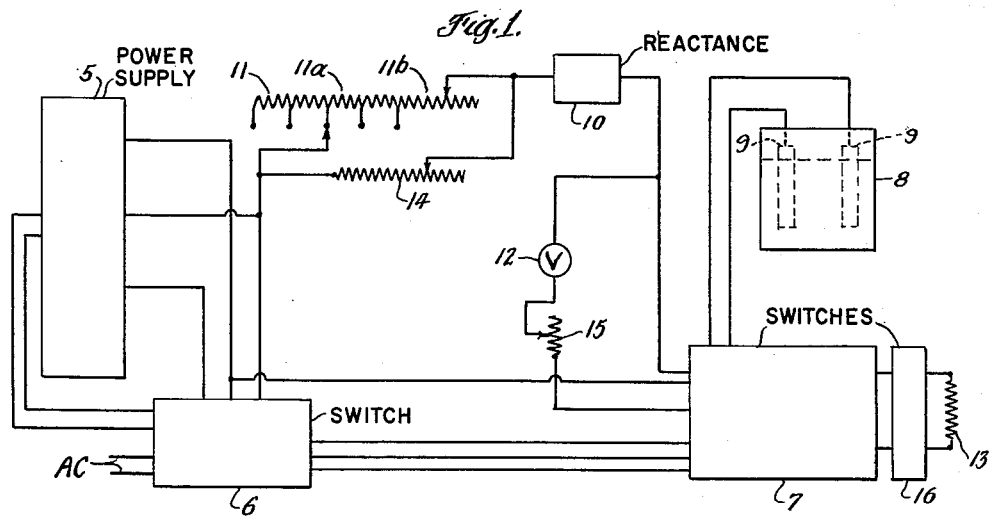
FIGURE 1 is a simplified block diagram of one form of equipment which I have described in my U.S. Patent 2,224,382 together with the parts added by the present invention.

Considering first FIGURE 1 and ignoring for the moment the improvements involved in the present invention, it can be seen that alternating current is delivered to the power supply 5 through a portion of the switch 6. The power supply 5 is essentially a transformer provided with secondary windings and connections thereto arranged to provide two substantially equal and in phase low voltage sources of current. The arrangement of the power supply described in full detail in my U.S. Patent 2,224,382 referred to above results in these two sources of current being quite insensitive to fluctuations in the A.C. line voltage. These two sources of current are interconnected by means of the switches 6 and 7 with the external circuit or test cell 8 whose resistance properties are to be determined.

For the purpose of illustration the external circuit 8 is shown as comprising a conducting liquid into which electrodes 9 are immersed. Inasmuch as the external circuit 8 may have, in addition to its resistance properties, reactance properties, the invention of my earlier U.S. patent contemplates inclusion in the measuring circuit of a reactance 10 to compensate for and balance out the reactance of the circuit being tested. The measuring circuit includes as the principal component the resistor 11, a portion of which, 11a, is adjustable in steps in order that a wide range of resistances may be measured. In addition, the resistor 11 is preferably provided with a variable portion 11b. This portion 11b is of great importance when the equipment is being used for the measurement of concentration in a liquid solution because the resistance of such a solution is dependent not only a concentration but upon temperature. The variable portion, 11b, of the resistor, when specially calibrated, provides a convenient means for compensating for the effects of the temperature.

The circuit includes as the sensing means of the equipment an alternating current voltmeter 12. The voltmeter has a high resistance relative to the value of the resistor 11.

Figures 3, 4:
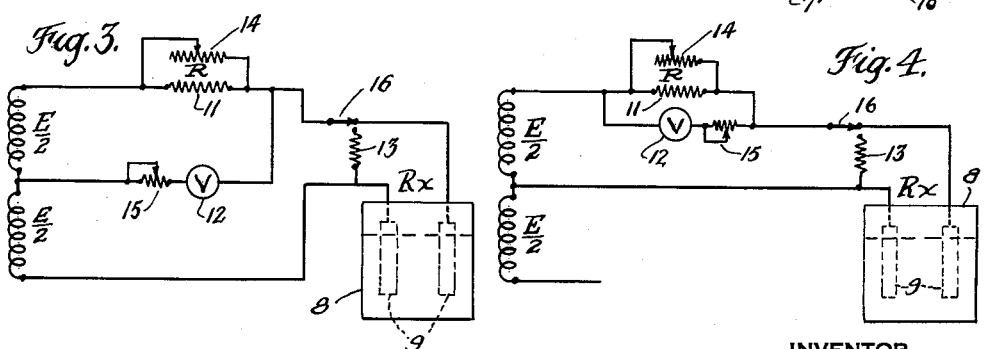
FIGURE 3 and FIGURE 4 are simplified diagrams of the basic circuits involved in the measuring equipment including additional parts contemplated by the present invention.

The switches 6 and 7 are arranged to organize the current sources, the resistor 11, the test cell 8, and the voltmeter into one or the other of the simplified circuits shown in FIGURES 3 and 4, alternately. It will be noted that for simplicity the compensating reactance 10 is not shown in either FIGURE 3 or FIGURE 4.

Considering now the alternate embodiment of the measuring equipment shown in FIGURE 2, and again postponing consideration of the improvement involved in this invention, it can be seen that the same basic components are involved. The power supply 5' is simpler than the power supply of FIGURE 1 but it is again arranged to provide two substantially equal and in phase low voltage sources of current. The circuit is also provided with switches 6' and 7' and is designed to be connected to a test cell 8'. A compensating reactance 10' is also contemplated in this embodiment. The resistor 11' is again divided in parts but in the embodiment shown is not provided with a stepped portion for modifying the range of concentration which may be measured. The variable portion 11b' is designed to compensate for the effect of temperature on the resistance of the test cell 8'. The indicating means in this embodiment is an alternating current voltmeter 12' which is of high resistance compared to the value of the resistor 11'. The switches 6' and 7' are adapted to arrange the components of FIGURE 2 into the simplified basic circuits of FIGURE 3 and FIGURE 4.

In FIGURE 3, $$\frac{E}{2}, \frac{E}{2}$$

indicates the two sources of equal voltage, 11 the resistor and 12 the voltmeter. For convenience, the resistance to the flow of current in the test cell 8 is designated Rx and the resistance of the resistor 11 is designated R.

If it be assumed for the moment that both the internal circuits of the equipment and the test cell 8 have negligible reactance, the reading of the voltmeter will accurately reflect the relative values of R and $Rx$.

If $$\frac{E}{2}$$

be chosen to represent the voltage of either of the two sources, and if V represents the indication of the voltmeter in volts, then, $$(1) \quad V = \frac{E}{2} - E\frac{R}{R+Rx} = \frac{E}{2}\frac{Rx-R}{Rx+R} = \frac{E}{2}\frac{\frac{Rx}{R}-1}{\frac{Rx}{R}+1}$$

In the basic circuit of FIGURE 4 it will first be noted that only one of the sources of current is employed. If the same nomenclature assigned in FIGURE 3 is used in FIGURE 4, the relation between the reading of the voltmeter and the values of the various components is given by $$(2) \quad V = \frac{E}{2}\frac{R}{Rx+R} = \frac{E}{2}\frac{1}{\frac{Rx}{R}+1}$$

As explained more fully in my earlier U.S. Patent 2,224,382 referred to above, these two circuits provide the measuring equipment with an extraordinary range and sensitivity. It will be realized of course that a separate voltmeter scale is required for each basic circuit. As mentioned earlier, I have found that the electrical characteristics of the various components shown in FIGURES 1 and 2 change when the equipment has been in service for a long period of time. An inspection of Equations 1 and 2 reveals that the reading of the voltmeter will be sensitive to changes in the value of $$\frac{E}{2}$$

and further will be sensitive to the degree in which the two current sources remain equal and in phase. That is to say, a failure of the two current sources to be equal and in phase will cause an inaccuracy in the reading of the voltmeter. In addition, the value indicated by the voltmeter will be sensitive to the resistance of the voltmeter itself. It will be remembered that it was specified that voltmeter resistance must be large with respect to the resistance R. This condition was, of course, an assumption involved in the derivation of Equations 1 and 2. A change in the resistance of the voltmeter will cause a change in the amount of current flowing through the meter, and hence a change in the reading, even though the conditions in the rest of the circuit remain substantially the same.

The problems caused by the sensitivity of the voltmeter reading to the values discussed above become particularly acute when the voltmeter is calibrated in terms of concentration, for example in weight percent. When the equipment is intended to be used for routine and repeated measurements of a solution containing a standard electrolyte, it is extremely desirable that the voltmeter be calibrated in terms of concentration inasmuch as this relieves the technician responsible for making such measurements of the burden of converting a raw voltage or resistance reading into terms of concentration by means of arithmetic calculations.

In view of the desirability of having the equipment indicate concentration directly, and in view of the sensitivity of the voltmeter readings to the constancy of value of various components of equipment, and further in view of the fact that these values have been found to change as a result of the aging of the equipment, I have found it desirable to provide means by which the technician operating the equipment can detect and correct inaccuracies in the measuring equipment. Since equipment of this type is often used on production lines, it is desirable that such detection and correction steps can be taken quickly and without removing the equipment from the production line.

Figure 2:
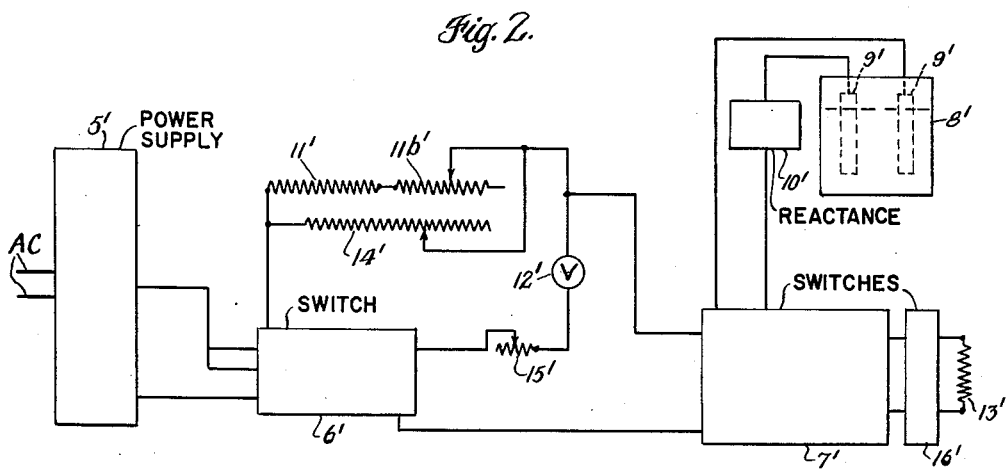
FIGURE 2 is a simplified block diagram of an alternate form of the equipment also described in my U.S. Patent 2,224,382 together with the parts required by the present invention.

In order to meet the requirements outlined above I add to the equipment shown in FIGURES 1 and 2 an internal resistor 13 together with a switch 16 for inserting the resistor 13 into the circuit in place of the test cell 8. The switch 16 may, in actual practice, be a portion of the switch 7. I further provide a variable resistor 14 which is arranged to be electrically parallel with at least a portion of the resistor 11. Electrically adjacent to the voltmeter 12 I provide a variable resistor 15.

It will be seen from a comparison of Equations 1 and 2 that for a value of $Rx$ equal to twice that of R, the indication of the voltmeter should be the same with either of the two circuits shown in FIGURES 3 and 4. In my invention I reproduce this condition by substituting for the test cell 8 ($Rx$) during the recalibration operation the resistor 13 which has a resistance equal to twice that of a predetermined value of the resistor 11. As pointed out above, the resistor 11 is preferably variable, at least in part. Therefore, in order to meet the above condition by substituting the resistor 13, the variable portion of the resistor 11 must be set at a fixed predetermined point. This can be facilitated by providing the calibrating dial of the portion of the resistor 11 which is variable with a small fiduciary mark indicating the selected resistance.

As pointed out above with the resistor 13 substituted into the circuit and with the resistor 11 set at the predetermined value, the voltmeter 12 should give the same reading for each of the circuits. One can easily determine if this condition is met in a given piece of equipment simply by manipulating the switch 6 back and forth between the two basic circuits shown in FIGURES 3 and 4 and observing the voltmeter.

As an example of a condition in the test equipment which would preclude the voltmeter readings being the same for each basic circuit, suppose that the voltages of the two current sources are unequal, although the sum of the voltage supplied by the two sources is equal to the design value. The voltmeter reading in the circuit shown in FIGURE 3, as indicated by Equation 1, $$(1) \quad V = \frac{E}{2} - E\frac{R}{R+Rx}$$

will differ from the correct reading because the value of the term $$\frac{E}{2}$$

is different from the design value.

The voltmeter reading for the circuit shown in FIGURE 4 will also be different from the design value as can be seen by considering Equation 2, $$(2) \quad V = \frac{E}{2}\frac{R}{Rx+R}$$

because the value $$\frac{E}{2}$$

is different from the design value. It can further be seen by a consideration of Equations 1 and 2 that the voltmeter readings for the circuits indicated by FIGURES 3 and 4 will differ not only from the design value but from each other. The values of the voltmeter readings under these conditions can be made equal to each other by adjusting the value of the term $$\frac{R}{R+Rx}$$

which appears in both Equations 1 and 2. The value of $Rx$ is unalterable since $Rx$ is in fact under these conditions the fixed resistor 13. Therefore, the adjustment must be made by changing the value of R. I accomplish this adjustment by means of the added variable resistor 14. The resistor preferably should have a minimum resistance equal to at least ten times the predetermined resistance of the resistor 11; in any event the resistor 14 should have a large resistance compared to the resistor 11. The resistor 14 is arranged to be electrically parallel to at least a portion of the resistor 11. The effective resistance of the combination comprising resistor 11 and resistor 14 is given by:

$$\frac{1}{R(\text{effective})} = \frac{1}{R_{11}} + \frac{1}{R_{14}}$$

where $R_{11}$ is the resistance of resistor 11 and $R_{14}$ is the resistance of resistor 14. It can first be observed that in view of the fact that the resistor 14 is a large resistance compared to the resistor 11, R(effective) will be of the same order of magnitude as the resistance of resistor 11. It can also be observed that large changes in the value of the variable resistor 14 will result in relatively small changes in the effective resistance. With this modification in the equipment, the term R(effective) may be substituted for the term R in Equations 1 and 2. It can be seen, therefore, that the desired adjustment of the term $$\frac{R}{R+Rx}$$

can be brought about by adjusting the variable resistor 14.

Mechanically this step is performed by the technician by switching back and forth between the circuits of FIGURE 3 and FIGURE 4 and adjusting the variable resistor 14 until the voltmeter readings are the same for each circuit. It must be kept in mind, however, that this adjusted reading of the voltmeter is not necessarily the correct reading.

The next step in the recalibration procedure following the equalization of the voltmeter readings described above is to provide the correct voltmeter scale value. It will be remembered that for the original recalibration conditions, namely $Rx=2R$, the voltmeter readings for each basic circuit were required by Equations 1 and 2 to be the same. An inspection of Equations 1 and 2 will reveal that when the two voltage sources are equal and in phase the voltmeter readings for the circuits of FIGURES 3 and 4 will not only be the same, but will have a specific value, namely $$\frac{E}{6}$$

It can safely be assumed that this was the condition obtaining when the equipment was new and when the scales on the voltmeter were calibrated and scribed for a particular value (i.e. the design value) of $$\frac{E}{2}$$

Therefore, the voltmeter scale for the circuit of FIGURE 3 and the voltmeter scale for the circuit of FIGURE 4 will have one value which is identical. Thus the problem involved in this step of the recalibration procedure is adjusting the reading of the voltmeter so that the readings which have been equalized in the previous step both fall at the point on the scale where the voltmeter scale for the circuit of FIGURE 3 and the voltmeter scale for the circuit of FIGURE 4 have identical values. This point may be termed for convenience the crossover point.

I accomplish this adjustment by providing the variable resistor 15 in series with, and electrically adjacent to the voltmeter 12. I prefer the resistor 15 to have a resistance not over 1/10 the operating resistance of the voltmeter; in any event the value of this resistor should be small when compared with the resistance of the voltmeter. Variation of the resistance of resistor 15 will modify the quantity of current which will flow through the voltmeter and thus change the reading of the voltmeter even though all other conditions within the circuit remain substantially the same. Mechanically the technician operating the unit adjusts the voltmeter readings (which have been previously equalized as discussed above) by switching back and forth between the two basic circuits and adjusting the value of the resistor 15.

As a further example of a change in the electrical characteristics of the power supply which can be compensated for by my invention, consider the case where the two current sources remain equal in voltage and in phase but where the sum of their voltage is either greater or less than the design value. In this case the first step of the recalibration procedure discussed above, namely the adjustment of the variable resistor 14, is not required inasmuch as the voltmeter readings will be the same for each basic circuit. However, under these conditions the voltmeter readings will not be at the crossover point. As outlined above, this deficiency may be remedied by adjustment of the variable resistor 15.

As another example of an alteration in the electrical characteristics of the power supply, it is possible that the two current sources may become slightly out of phase with or without a change in the voltage of each. I have found that such a condition may be regarded as being substantially the same as an inequality in the voltages of the two current supplies and may be compensated for in the manner described above, by adjusting the variable resistor 14 and the variable resistor 15.

With aging the electrical characteristics of the voltmeter and in particular its resistance may change, thereby changing the magnitude of the readings. This condition may be compensated for in my invention by the adjustment of the variable resistor 15.

It can be seen that various combinations of the changes of electrical characteristics of components of the measuring equipment discussed above may occur. It can further be seen, however, that my invention has the capability for compensating for such combinations of changes.

It should be noted that my invention does not require the technician operating it to engage in any of the analyses discussed above. His performance need only be mechanical and careful. The operation which a technician would be instructed to perform at standard routine intervals of time would be generally as follows: First, set the variable portion of the resistor 11 to a predetermined value as indicated by a fiduciary mark on the dial associated with said variable portion of the resistor. Second, operate the switch 16 to replace the test cell 8 with the resistor 13. Third, operate the switch 6 back and forth to change from one basic circuit to the other, observing for each position of the switch the readings of the voltmeter 12. Fourth, if the readings of the voltmeter 12 are not identical for each position of the switch 6, adjust the variable resistor 14 until the readings are identical. Fifth, if the identical readings of the voltmeter 12 are not at the crossover point of the voltmeter scales, adjust the resistor 15 until the voltmeter indicates the crossover point for both positions of the switch 6, that is, for both basic circuits.

After the completion of this calibration procedure the resistor 13 is switched out of the circuit and the test cell 8 is switched back into the circuit. I have found that this method of recalibration restores the accuracy of the test equipment to a suitable level over the entire range of quantities which the equipment is designed to measure.

I claim:

1. In equipment for measuring the resistance of a circuit, said equipment being of the type having two alternating current sources in phase and of substantially equal voltage, a first resistor, an alternating current voltmeter of high resistance compared with that of said first resistor, and a first switching means providing for series connection of the two current sources, said circuit and the first resistor and for parallel connection of the voltmeter across said first resistor and the source of current adjacent thereto, the switching means further providing for alternative connection of the parts with the first resistor and said circuit in series with one of the current sources and with the meter in parallel with the first resistor; the improvement which consists in adding to such equipment: an internal second resistor having double the resistance of a predetermined value of said first resistor, a second switching means for connecting said second resistor in place of said circuit, a variable third resistor of large resistance as compared with the resistance of the first resistor, connected in parallel with at least a substantial portion of the first resistor, and a variable fourth resistor of small resistance as compared with the operating resistance of the voltmeter and connected in series with the voltmeter.

2. In equipment for measuring the resistance of a circuit, said equipment being of the type having two alternating current sources in phase and of substantially equal voltage, a first resistor, an alternating current voltmeter of high resistance compared with that of said first resistor, and a first switching means providing for series connection of the two current sources, said circuit and the first resistor and for parallel connection of the voltmeter across said first resistor and the source of current adjacent thereto, the switching means further providing for alternative connection of the parts with the first resistor and said circuit in series with one of the current sources and with the meter in parallel with the first resistor; the improvement which consists in adding to such equipment: an internal second resistor having double the resistance of a predetermined value of said first resistor, a second switching means for connecting said second resistor in place of said circuit, a variable third resistor of at least ten times the resistance of the first resistor, connected in parallel with at least a substantial portion of the first resistor, and a variable fourth resistor of resistance not over one tenth the operating resistance of the voltmeter and connected in series with the voltmeter.

References Cited in the file of this patent

UNITED STATES PATENTS

| | | |
|---|---|---|
| 2,224,382 | Douty | Dec. 10, 1940 |
| 2,422,873 | Wolfner | June 24, 1947 |
| 2,565,501 | Ingram | Aug. 28, 1951 |